Sept. 5, 1961 J. N. J. LEEMAN 2,998,882
PROCESS FOR PURIFYING A SUSPENSION OF FINE
MAGNETIZABLE PARTICLES IN A LIQUID
Filed May 15, 1958
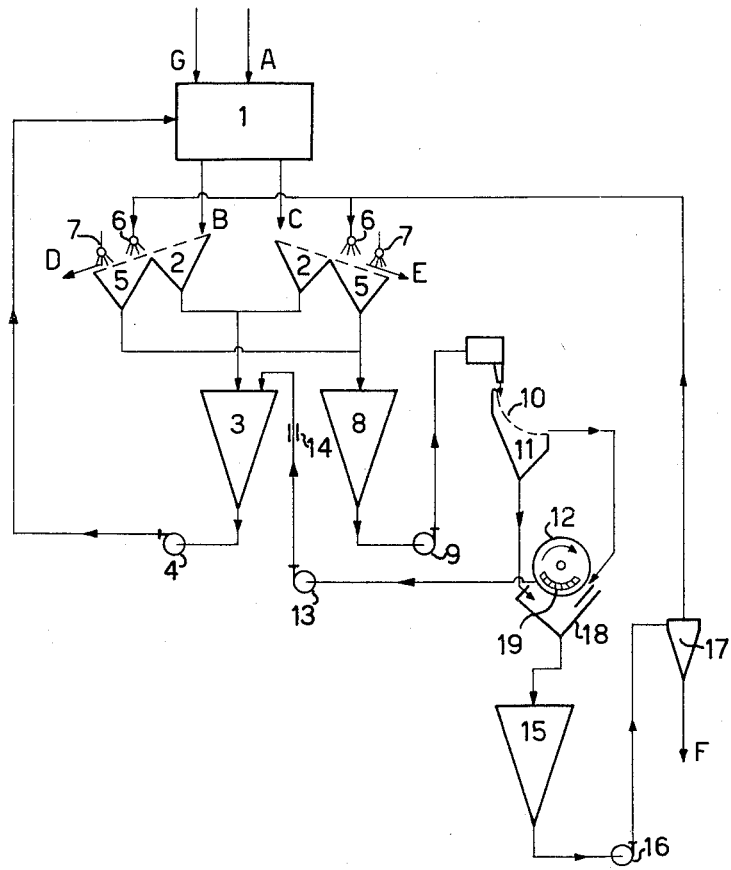
Inventor
Jan N. J. Leeman
By Cushman, Darby & Cushman
Attorneys

United States Patent Office 2,998,882
Patented Sept. 5, 1961

2,998,882
PROCESS FOR PURIFYING A SUSPENSION OF FINE MAGNETIZABLE PARTICLES IN A LIQUID
Jan N. J. Leeman, Brunssum, Netherlands, assignor to Stamicarbon N.V., Heerlen, Netherlands
Filed May 15, 1958, Ser. No. 735,459
Claims priority, application Netherlands May 16, 1957
6 Claims. (Cl. 209—172.5)

The present invention relates to a process and apparatus for purifying a suspension of fine magnetizable particles in a liquid, which suspension is contaminated by particles of a non-magnetizable material, a large part of which are coarser than the magnetizable particles, in which process the suspension to be purified is separated into a fraction mainly containing particles coarser than the magnetizable particles and a fraction which mainly contains the finer particles, which fractions are separated, by means of at least one magnetic separator, into a fraction rich in magnetizable particles and another containing few magnetizable particles or none at all.

A process of this kind is used in coal and ore washeries, where the raw product is separated into a fraction of low and a fraction of high specific gravity by means of a suspension of magnetite or ferrosilicon in water. The suspension removed from these fractions is contaminated by non-magnetic fine particles of the separated material, which particles have to be removed before the suspension is returned to the separator.

In the known process the coarse and fine fractions of the suspension to be purified are treated separately, as a rule by leading them into separate magnetic separators. A disadvantage is, however, that the installation is rather expensive, owing to the high cost of the magnetic separators and their driving mechanisms. However, treating the total amount of suspension to be purified in one magnetic separator involves the disadvantage that the magnetic fraction separated off contains rather a large amount of non-magnetizable particles enclosed among magnetic particles sticking together. As a result, the viscosity of the recovered suspension becomes too high, which has an unfavorable effect on the sharpness of the cut made by the separator.

The present invention provides a process and apparatus for purifying suspensions of magnetizable particles in which a single magnetic separator can be used without the content of non-magnetizable particles of the purified suspension getting too high.

This is achieved in that, according to the invention, the fine and coarse fractions of the suspension to be purified are led into a single magnetic separataor in places removed from each other. At the point where the coarse fraction comes into contact with the magnets of the magnetic separtor, the magnetite concentration is low, owing to the fact that a large portion, e.g. 80–90%, of the magnetic particles is brought into contact with the magnets in another place. As a result, the magnetite contained in the coarse fraction is attracted by the magnets without non-magnetic particles being enclosed. At the spot where the fine fraction is fed into the magnetic separator the amount of impurities is small, owing to the high degree of purity of this fraction, in consequence of which the amount of impurities enclosed among the separated magnetic particles is likewise small. By preference the fine fraction is fed into the magnetic separator near the point where the magnetic fraction is discharged and the coarse fraction at the end away from this point. The greater part of the magnetizable particles is then rapidly discharged from the magnetic separator before it has the chance of enclosing impurities. It is also possible according to the invention to feed the fine and coarse fractions into one magnetic separator in places removed from each other in the width of the magnetic separator. In this case the fractions may flow through the magnetic separator in the same direction as the belt or drum of the magnetic separator, or in counter-current relation thereto, and be kept separated from each other by means of a vertical plate fitted in the feed tank.

Owing to the low content of impurities of the separated magnetic fraction it is not necessary to wash this fraction on the belt or drum of the magnetic separator so as to reduce this content to below a certain permissible value. As a result, the magnetic fraction can be recovered in a concentrated state, so that it can be returned to the separating apparatus without having been passed through a thickener arranged behind the magnetic separator.

The invention is further explained with reference to the diagram of a coal washery shown in the drawing.

In the separating apparatus 1 raw coal is separated by means of a magnetite suspension into washed coal and shale. The coal to be washed is fed into the separating apparatus at A, the separated coal and shale fractions leaving the apparatus at B and C together with an amount of separating suspension. The separated fractions are led over screens 2, where the suspension has the opportunity to drip from these fractions. This suspension, which has the same specific gravity as the suspension in the separating apparatus, is collected in a tank 3 and returned to the separating apparatus 1 by a pump 4.

Subsequently, the separated fractions are led across screens 5, where they are sprayed with clarified and next with clear water by the sprayers 6 and 7 in order that the adhering suspension may be removed, after which the washed coal and shale are discharged at D and E. The screens 2 and 5 are, e.g., vibrating screens with a mesh of 1 mm.

The dilute suspension passing through the screens 5 is collected in a tank 8 and from there supplied, by means of a pump 9, to a sieve bend 10 with a slot width of 0.5 mm. As described in the U.S. Patent 2,916,142, the underflow of such a sieve bend contains, besides liquid, only particles whose grain size is smaller than about half of the slot width, which means that in the case under consideration they will be smaller than 0.25 mm. Through the openings in the screening deck flows about 90% of the liquid supplied to the screen, together with the particles suspended therein. As the size of the magnetite particles is smaller than $100\mu$, 90% of the magnetite is consequently collected in the collecting tank 11 under the screen. The overflow of the sieve bend contains the coarser non-magnetic particles and 10% of the magnetite suspension and the fine impurities.

Both the underflow and the overflow of the sieve bend are directly fed into a magnetic separator 12, the direction of rotation of which is shown by the arrow in the drawing. The underflow of the sieve bend is fed into the tank 18 under the magnetic separator, near the place where the drum or belt of the magnetic separator leaves this tank, and the overflow of the sieve bend is led into the tank at the opposite end. The coarse impurities can immediately settle here without being hindered by the presence of large amounts of magnetite. The magnetite attracted by the magnets 19 from the coarse fraction is, consequently, practically free of non-magnetic particles. At the spot where the underflow of the sieve bend is fed in, the content of non-magnetic particles is low, so that the magnetite fraction eventually recovered in the magnetic separator is very pure. Therefore, this fraction can be discharged in the concentrated state (specific gravity about 2.1) and be pumped to the collecting tank 3 by a pump 13. On its way the suspension may be led through a demagnetizing coil 14. If the separating apparatus 1 consists of one or more cyclones it is, however, not necessary to demagnetize the suspension. The suspension is then pumped to the separating apparatus, together with the suspension from the drainage screens 2 which was led into the collecting tank. It is also possible to pump the magnetite suspension recovered in the magnetic separator 12 directly to the separating apparatus. In both cases the specific gravity of the suspension fed into the separating apparatus will be higher than the specific gravity desired for the treatment in the said apparatus which is, e.g., 1.6. The specific gravity may be simply adjusted to the desired value by supplying the correct quantity of water at G.

In the magnetic separator 12 a dilute non-magnetic fraction is further recovered, which is led into a collecting tank 15 and thence by means of a pump 16 into a hydrocyclone 17, where the impurities are to be removed. The clarified overflow fraction from this hydrocyclone is led to the sprayers 6, to serve as washing water, while the discharge fraction F of the hydrocyclone is removed from the system and may be subjected to further treatment, e.g. in a froth flotation plant.

I claim:

1. Process of washing coal comprising the steps of separating raw coal into coal and shale fractions by means of a separating suspension of fine magnetizable particles in a liquid, recovering from said separated coal and shale fractions diluted suspension contaminated by particles of non-magnetizable material a large portion of which are coarser than the magnetizable particles, separating the contaminated dilute suspension into two fractions, one of said fractions containing mainly particles coarser than the magnetizable particles and the other fraction containing mainly the finer particles, subjecting both fractions to magnetic separation in a common magnetic separator to purify and concentrate said suspension, the respective fractions being fed to different sections of said common separator, and then returning the purified and concentrated suspension to the raw coal separation step.

2. Process according to claim 1, wherein the fine fraction is fed to said common separator adjacent the magnetic material discharge therefrom, and the coarse fraction is fed to a point remote from said magnetic material discharge.

3. Process according to claim 1, wherein the respective fractions are fed to transversely separated sections of said common separator.

4. A heavy medium separation process comprising the steps of separating material into light and heavy fractions by means of a separating suspension of fine magnetizable particles in a liquid, recovering from said separated fractions diluted suspension contaminated by particles of non-magnetizable material a large portion of which are coarser than the magnetizable particles, separating the contaminated dilute suspension into two fractions, one of said fractions containing mainly particles coarser than the magnetizable particles and the other fraction containing mainly the finer particles, subjecting both fractions to magnetic separation in a common magnetic separator to purify and concentrate said suspension, the respective fractions being fed to different sections of said common separator, and then returning the purified and concentrated suspension to the material separation step.

5. Process according to claim 4, wherein the fine fraction is fed to said common separator adjacent the magnetic material discharge therefrom, and the coarse fraction is fed to a point remote from said magnetic material discharge.

6. Process according to claim 4, wherein the respective fractions are fed to transversely separated sections of said common separator.

References Cited in the file of this patent

UNITED STATES PATENTS

| 1,797,597 | Ullrich | Mar. 24, 1931 |
| 2,429,436 | Walker | Oct. 21, 1947 |
| 2,692,048 | Davis | Oct. 19, 1954 |
| 2,738,069 | Roller | Mar. 13, 1956 |
| 2,781,906 | Fontein | Feb. 19, 1957 |

FOREIGN PATENTS

| 423,684 | Great Britain | Feb. 6, 1935 |